Jan. 23, 1962 J. CARLSTEIN 3,018,395
TACHOMETER GENERATOR
Filed July 15, 1960 2 Sheets-Sheet 1
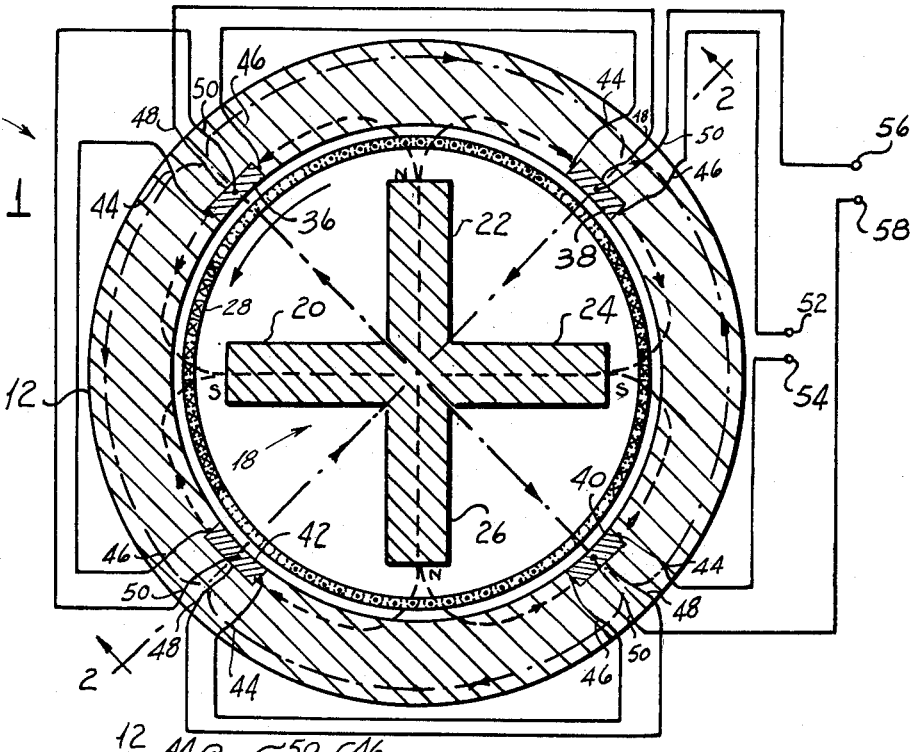
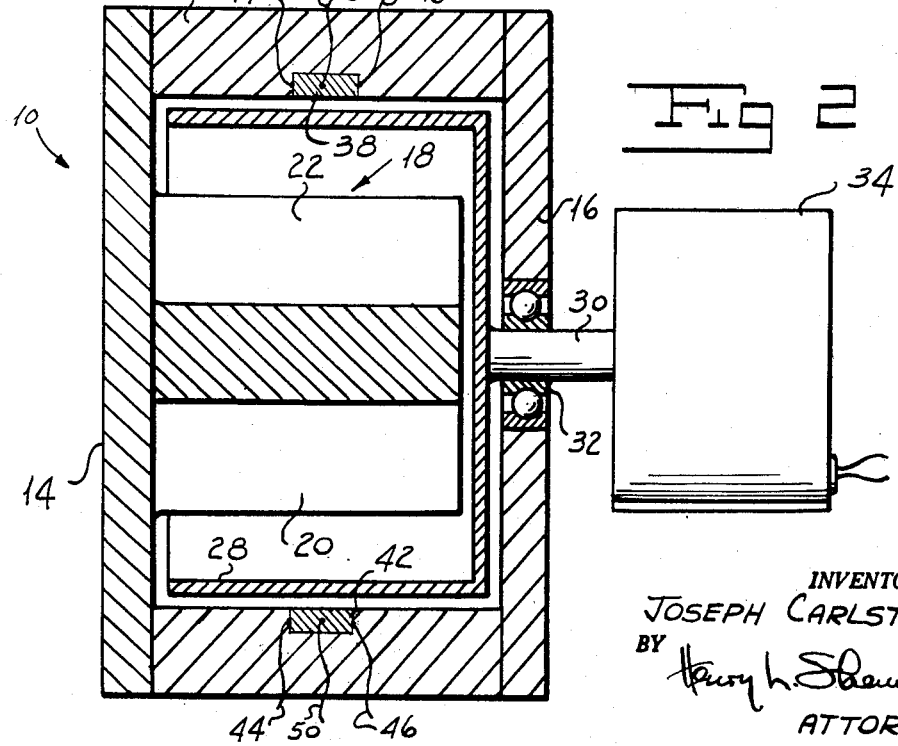
INVENTOR.
JOSEPH CARLSTEIN
BY
ATTORNEY Jan. 23, 1962   J. CARLSTEIN   3,018,395
TACHOMETER GENERATOR
Filed July 15, 1960   2 Sheets-Sheet 2

INVENTOR.
JOSEPH CARLSTEIN
BY
ATTORNEY

United States Patent Office 3,018,395
Patented Jan. 23, 1962

3,018,395
TACHOMETER GENERATOR
Joseph Carlstein, East Meadow, N.Y., assignor to United Aircraft Corporation, East Hartford, Conn., a corporation of Delaware
Filed July 15, 1960, Ser. No. 43,223
7 Claims. (Cl. 310—40)

My invention relates to a tachometer generator and more particularly to an improved tachometer generator which is simpler in construction and which is more certain in operation than are tachometer generators of the prior art.

Tachometer generators are known in the prior art. In one form of tachometer generator known in the prior art a secondary magnetic field having a magnitude which is proportional to the speed of a rotating member induces voltage in an output winding. The output winding voltage thus provides a measure of the speed of the rotating member. This type of tachometer generator embodies a number of defects. As is well known, the output windings are relatively expensive to construct. It is desirable that the voltage which provides the measure of the speed of the rotating member may be of any desirable frequency. The frequency of the output voltage of tachometer generators of the type known in the prior art is not readily changed.

I have invented a tachometer generator which overcomes the defects of tachometer generators of the prior art pointed out hereinabove. My generator does not require the expensive output windings which are necessary in generators of the prior art and thus it is simpler and less expensive to construct. I may make the output voltage of my tachometer generator of any frequency including direct current.

One object of my invention is to provide a tachometer generator which produces an output voltage, the magnitude of which is a linear function of the speed of a rotating member.

Another object of my invention is to provide a tachometer generator which is simpler and which is less expensive to construct than are tachometer generators of the prior art.

Yet another object of my invention is to provide a tachometer generator, the output frequency of which can readily be made to be any desirable frequency including direct current.

Other and further objects of my invention will appear from the following description.

In general my invention contemplates the provision of a tachometer generator in which a conductive member rotating in the field of a magnet with a plurality of poles has circulating currents generated therein. These circulating currents set up a secondary magnetic field, the strength of which is proportional to the speed of rotation of the member and which lies along the interpole axes of the magnet. I mount a plurality of Hall crystals at the interpole axes in positions at which the secondary magnetic field passes through the crystals in a direction perpendicular to the direction of the exciting current through the crystals to cause the latter to produce an output voltage which is proportional to the speed of rotation of the conductive member.

In the accompanying drawings which form part of the instant specification and which are to be read in conjunction therewith and in which like reference numerals are used to indicate like parts in the various views:

FIGURE 1 is a sectional view illustrating one form of my improved tachometer generator.

FIGURE 2 is a sectional view of the form of my tachometer generator shown in FIGURE 1 and taken along the line 2—2 of FIGURE 1.

Figure 3:
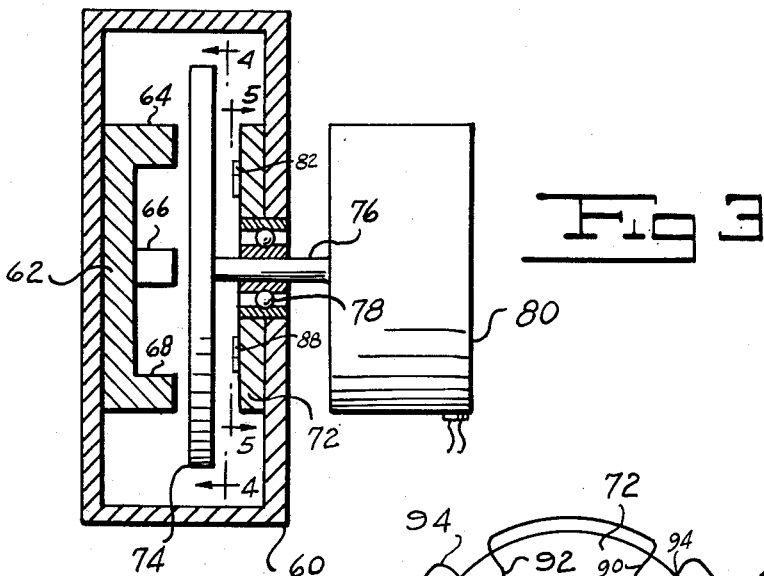
FIGURE 3 is a sectional view of an alternate form of my tachometer generator.

Referring now to FIGURES 1 and 2 of the drawings, one form of my improved tachometer generator, indicated generally by the reference character 10, includes a yoke 12 and a pair of end plates 14 and 16 secured to the yoke 12 by any suitable means known to the art. I secure a permanent magnetic or an electromagnetic assembly, indicated generally by the reference character 18, and having respective poles 20, 22, 24, and 26 to the plate 14 by any suitable means such as by welding. Adjacent ones of the poles 20, 22, 24, and 26 are opposite in polarity with the result that the assembly 18 produces a magnetic field, the direction of which is indicated by the broken lines in FIGURE 1. It will be appreciated that the yoke 12 is formed of magnetic material which provides a return path for the flux emanating from the north poles 22 and 26.

The form of my tachometer generator shown in FIGURE 1 includes a cup 28 formed of conductive material carried by a shaft 30 rotatably supported in the plate 16 by a bearing 32. I connect any suitable driving device such, for example, as a motor 34 whose speed is to be measured to the shaft 30. When motor 34 is energized to drive the shaft 30, cup 28 rotates in the magnetic field produced by the magnetic assembly 18. As is known in the art, when a conductive member rotates in a magnetic field, circulating currents are generated in the conductive member. Considering the conductive cup 28 to be made up of a plurality of conductors extending in the direction of the axis of the cup, the currents induced in those conductors directly over a north pole such, for example, as the pole 22 flow into the paper as is indicated schematically in FIGURE 1. Conductors passing through the field of a south pole such, for example, as the pole 24 have induced therein currents flowing in a direction out of the paper as indicated schematically in FIGURE 1. It will readily be appreciated that the circulating currents in the cup 28 as it rotates in the field of the magnetic assembly 18 produce magnetic flux in the directions indicated by the dot-dash lines in FIGURE 1. As can readily be seen in the figure, this flux lies along respective mutually perpendicular axes mid-way between the axes of adjacent ones of the poles 20, 22, 24, and 26. The yoke 12 provides a return path for the flux resulting from the currents circulating in the member 28.

I mount a plurality of respective Hall effect crystals 36, 38, 40, and 42 on the yoke 12 in positions at which the flux resulting from the currents induced in the cup 28 passes through the crystals. Each of the Hall crystals 36, 38, 40, and 42 may be formed of any suitable semiconductor material known to the art and has a pair of current leads 44 and 46 adapted to pass current through the crystal in the direction of one axis and a pair of output conductors 48 and 50 connected to the crystal at points adjacent to the ends of an axis of the crystal which is perpendicular to the current axis of the crystal. As is well known in the art, if a current passes through a Hall crystal in the direction of one axis while magnetic flux passes through the crystal in the direction of an axis perpendicular to the first axis, then the crystal produces an output voltage in the direction of a third axis perpendicular to the first two axes. As is further known in the art, the magnitude of the output voltage is directly proportional to the strength of the magnetic field and to the strength of the current. Thus if the current magnitude remains constant, then the output voltage varies directly with variations in the strength of the magnetic field.

I connect the current leads 44 and 46 of the respective crystals in series between a pair of terminals 52 and 54 of a suitable source of electrical energy adapted to pass a current through all the crystals. It is to be understood that the source having the terminals 52 and 54 may be a source of direct current or it may be a source of alternating current of any suitable frequency. I connect the voltage conductors 48 and 50 of the Hall crystals in series between a pair of respective output terminals 56 and 58.

As has been explained hereinabove and as is known in the art, as the conductive cup 28 rotates in the magnetic field produced by the assembly 18, there are induced in the cup circulating currents, the magnitude of which is directly proportional to the speed of rotation of the cup. The magnetic field resulting from these currents likewise is proportional to the speed of rotation of the cup. As has further been pointed out hereinabove, the output voltage of a Hall crystal is directly proportional to the strength of the magnetic field passing through the crystal. It will then be seen that the output voltage at the terminals 56 and 58 is directly proportional to the speed of rotation of the conductive cup 28. Since the magnetic flux produced by the magnetic assembly 18 is perpendicular to the flux axes of the Hall crystals rather than being in the direction of this axis, this flux has no appreciable effect on the output voltage of the Hall crystal.

Figure 5:
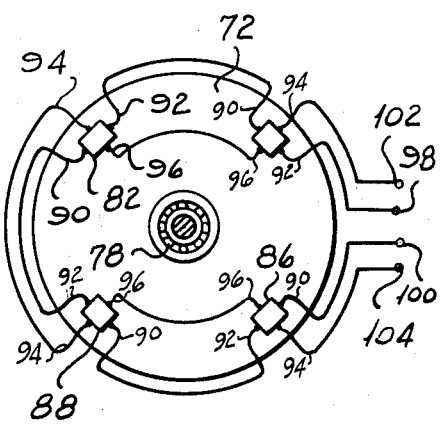
FIGURE 5 is a sectional view of the form of my improved tachometer generator shown in FIGURE 3 taken along the line 5—5 of FIGURE 3.
Figure 4:
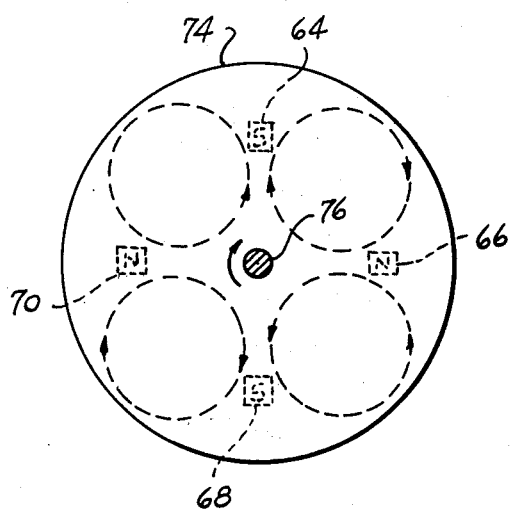
FIGURE 4 is a sectional view of the form of my improved tachometer generator shown in FIGURE 3 taken along the line 4—4 of FIGURE 3.

Referring now to FIGURES 3 to 5, I have shown an alternate form of my tachometer generator in which the flux is axial rather than radial as in the form of my invention shown in FIGURES 1 and 2. This form of my invention includes a housing 60 carrying a magnet assembly 62 having a plurality of respective axially extending poles 64, 66, 68, and 70. The housing 60 carries a member 72 formed of magnetic material for providing the return path for the flux produced by the assembly 62. In this form of my invention I mount a disk 74 formed of conductive material on a shaft 76 rotatably supported in a bearing 78 carried by the housing 60.

As is the case with the form of my invention shown in FIGURES 1 and 2, I connect the device such as a motor 80, the speed of which is to be measured, to the shaft 76. As the disk 74 rotates when motor 80 is energized, there are induced in the disk 74 circulating currents such, for example, as those indicated by the broken lines in FIGURE 4. The circulating currents produce a magnetic field, the direction of which is in the direction of axes intermediate the axes of adjacent poles of the assembly 62. I mount a plurality of Hall effect crystals 82, 84, 86, and 88 on the member 72 in positions at which the flux produced by the circulating currents in the disk 74 passes through the crystals in a direction which is perpendicular both to the direction in which current leads 90 and 92 pass current through the crystal and to the direction along which conductors 94 and 96 carry the output voltage to the external circuit. As is the case with the form of my invention shown in FIGURES 1 and 2, as the disk 74 rotates, circulating currents proportional to the speed of rotation of the disk are generated therein. The circulating currents produce a magnetic field, the strength of which is proportional to the speed of rotation of the disk. As the field produced by the circulating current passes through the crystals 82, 84, 86, and 88, they produce an output voltage which is directly proportional to the speed of rotation of the disk. I connect the current leads 90 and 92 of the crystals of the form of my invention shown in FIGURES 3 to 5 in series between input terminals 98 and 100 and I connect the output leads 94 and 96 of these crystals in series between output terminals 102 and 104.

In operation of the form of my invention shown in FIGURES 1 and 2, when motor 34 is energized, it drives shaft 30 to rotate cup 28 in the field produced by the magnetic assembly 18. Owing to this rotation, circulating currents flowing generally in the directions indicated schematically in FIGURE 1 are generated in the cup 28. As is known in the art, the magnitude of these currents and of the resultant field is proportional to the speed of rotation of the cup. As has been explained hereinabove, the magnetic field produced by the assembly 18 produces a flux which is perpendicular to the interpole axis so that it has substantially no effect on the output voltage of the Hall crystals 36, 38, 40, and 42. The secondary magnetic field resulting from the circulating currents in the cup 28 lies along the interpole axes with the result that its flux passes through the crystals in a direction perpendicular both to the axis through which current passes and the axis along which the output voltage is taken from the crystal. Since the magnetic flux is proportional to the speed of rotation of the cup, the output voltage provides a linear measure of speed. As has further been explained hereinabove, the input voltage to the Hall crystals through terminals 52 and 54 may be direct current or it may be alternating current of any desired frequency.

The operation of the form of my invention shown in FIGURES 3 to 5 is analogous to that of the form shown in FIGURES 1 and 2. As motor 80 drives the disk 74 in the field of the magnetic assembly, circulating currents of the nature of those indicated in broken lines in FIGURE 4 are generated in the disk. It will be seen that these circulating currents produce a magnetic field lying along axes which are intermediate the axes of adjacent poles of the permanent magnetic assembly. Owing to the location of the Hall crystals 82, 84, 86, and 88, the secondary magnetic field produced by the circulating currents generates voltages in the Hall crystals which have a magnitude proportional to the speed of rotation of the disk.

It will be seen that I have accomplished the objects of my invention. I have provided a tachometer generator which produces an output voltage having a magnitude which is directly proportional to the speed of the member whose speed is to be measured. My device does not require the expensive output windings employed in devices of the prior art with the result that it is less expensive and simpler in construction than are tachometer generators of the prior art. My tachometer generator permits me to produce an output voltage of any desired frequency, the magnitude of which voltage affords a measure of speed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A tachometer for measuring the speed of a moving element including in combination a magnet for producing a magnetic field, a member formed of conductive material, means responsive to motion of said element for moving said conductive member through said magnetic field to cause eddy currents to be generated in said conductive member whereby said eddy currents produce a secondary magnetic field having a strength which is proportional to the speed of movement of said element, a semi-conductor crystal, means mounting said crystal in a position at which said secondary magnetic field passes through said crystal in the direction of a first axis and means for passing current through said crystal along a second axis substantially perpendicular to said first axis to cause said crystal to produce an output voltage proportional to the speed of movement of said element.

2. A tachometer for measuring an input speed including in combination a magnet for producing a magnetic field, a member formed of conductive material, means mounting said member for movement in said magnetic field, means for driving said member at said input speed to cause said magnetic field to generate eddy currents in said member whereby said eddy currents produce a secondary magnetic field having a strength which is a function of said input speed, a semi-conductor element, means mounting said element in a position at which said secondary magnetic field passes through said element in the direction of a first axis and means for passing current through said element along an axis substantially at right angles to said first axis to cause said element to produce an output voltage proportional to said input speed.

3. A tachometer for measuring an input speed including in combination a magnet for producing a magnetic field, a yoke formed of magnetic material, means mounting said yoke in a position with respect to said magnet to provide a return path for said magnetic field, a member formed of conductive material, means mounting said member for rotary movement in said magnetic field, means for driving said member at said input speed to cause said magnetic field to generate eddy currents in said member whereby said eddy currents produce a secondary magnetic field having a strength which is a function of said input speed, a semi-conductor element having current input leads for passing current through said element in the direction of an axis and having voltage output leads adapted to receive a voltage generated in said element in the direction of a second axis substantially perpendicular to the first axis, means mounting said element in a position at which said secondary magnetic field passes through the element in the direction of a third axis which is mutually substantially perpendicular to said first and second axes and means for supplying current to said current input leads whereby said voltage leads carry an output voltage which is a function of said input speed.

4. A tachometer for measuring an input speed including in combination a magnet having a plurality of poles and adapted to produce a magnetic field, a member formed of conductive material, means for moving said member through said magnetic field at said input speed to cause said magnetic field to generate eddy currents in said member whereby said eddy currents produce a secondary magnetic field at an inter-pole position, a semi-conductor element, means mounting said semi-conductor element at said inter-pole position whereby said secondary magnetic field passes through said element and means for passing current through said element in the direction of an axis substantially at right angles to said secondary magnetic field whereby said element generates an output voltage which is a function of said input speed.

5. A tachometer for measuring an input speed including in combination a magnet having a plurality of poles for producing a magnetic field, a member formed of conductive material, means for driving said conductive member through said magnetic field at said input speed to cause said field to generate eddy currents in said member whereby said eddy currents produce a secondary magnetic field at inter-pole positions, a plurality of semi-conductor elements, means mounting said elements at said inter-pole positions whereby said secondary magnetic field passes through said elements and means for passing current through said elements in a direction substantially perpendicular to said secondary magnetic field to cause said elements to generate output voltages which are proportional to said input speed.

6. A tachometer for measuring an input speed including in combination a magnet having a plurality of radially extending poles for producing a magnetic field, a cup formed of conductive material, means for driving said cup through said magnetic field at said input speed to cause said field to generate eddy currents in said cup whereby said eddy currents produce a secondary magnetic field at inter-pole positions, a plurality of semi-conductor elements, means mounting said elements at said inter-pole positions whereby said secondary magnetic field passes through said elements and means for passing current through said elements in a direction substantially perpendicular to said secondary magnetic field to cause said elements to generate output voltages which are proportional to said input speed.

7. A tachometer for measuring an input speed including in combination a magnet having a plurality of axially extending poles for producing a magnetic field, a disc formed of conductive material, means for driving said disc through said magnetic field at said input speed to cause said field to generate eddy currents in said disc whereby said eddy currents produce a secondary magnetic field at inter-pole positions, a plurality of semi-conductor elements, means mounting said elements at said inter-pole positions whereby said secondary magnetic field passes through said elements and means for passing current through said elements in a direction substantially perpendicular to said secondary magnetic field to cause said elements to generate output voltages which are proportional to said input speed.

No references cited.